US012678673B2

(12) United States Patent (10) Patent No.: US 12,678,673 B2

Couto et al. (45) Date of Patent: Jul. 14, 2026

(54) VERTICAL DELIVERY SYSTEM FOR GOLF BALLS

(71) Applicant: Acushnet Company, Fairhaven, MA (US)

(72) Inventors: Michael A. Couto, New Bedford, MA (US); Jedediah H. James, Dighton, MA (US); Roy A. Langton, Tiverton, RI (US)

(73) Assignee: Acushnet Company, Fairhaven, MA (US)

( * ) Notice: Subject to any disclaimer, the term of this patent is extended or adjusted under 35 U.S.C. 154(b) by 83 days.

(21) Appl. No.: 18/615,362

(22) Filed: Mar. 25, 2024

(65) Prior Publication Data

US 2025/0296779 A1 Sep. 25, 2025

(51) Int. Cl.
| | |
|---|---|
| *A63B 57/00* | (2015.01) |
| *A63B 47/00* | (2006.01) |
| *B65G 11/08* | (2006.01) |
| *B65G 11/20* | (2006.01) |

(52) U.S. Cl.
CPC ........ *A63B 57/0006* (2013.01); *A63B 47/002* (2013.01); *B65G 11/086* (2013.01); *B65G 11/203* (2013.01); *B65G 2201/0214* (2013.01)

(58) Field of Classification Search
CPC ............ A63B 47/002; A63B 2047/004; A63B 57/0006; B65G 11/086; B65G 11/203
USPC ...................................... 193/27, 32
See application file for complete search history.

(56) References Cited

U.S. PATENT DOCUMENTS

| | | | | |
|---|---|---|---|---|
| 2,840,211 A * | 6/1958 | Zawaski | .............. | B65G 11/086 |
| | | | | 193/27 |
| 3,034,626 A * | 5/1962 | Kay | ........................ | B65G 69/12 |
| | | | | 193/32 |
| 4,575,092 A * | 3/1986 | Watson | ................ | A63B 47/002 |
| | | | | 473/137 |
| 5,411,267 A * | 5/1995 | Burks | ................ | A63B 57/0006 |
| | | | | 473/133 |
| 5,662,526 A * | 9/1997 | Sutherlin | ........... | A63B 57/0006 |
| | | | | 473/133 |
| 6,328,659 B1 * | 12/2001 | Peterson | ............ | A63B 57/0006 |
| | | | | 473/137 |
| 6,440,007 B1 * | 8/2002 | Imahata | ............. | A63B 57/0006 |
| | | | | 473/282 |
| 6,453,641 B1 * | 9/2002 | Puckett | ................... | B65B 7/285 |
| | | | | 53/313 |
| 7,018,300 B2 * | 3/2006 | Paicos | ................ | A63B 57/0006 |
| | | | | 473/135 |
| 7,059,969 B2 * | 6/2006 | Howe | .................. | A63B 47/002 |
| | | | | 473/137 |

* cited by examiner

*Primary Examiner* — Gene O Crawford
*Assistant Examiner* — Keith R Campbell
(74) *Attorney, Agent, or Firm* — Steven Landolfi, Jr.

(57) ABSTRACT

A delivery system for transporting a golf ball from a first location to a second location has a transport track. The transport track has a first track and a second track. The first track has a first contact edge and a second contact edge configured to simultaneously contact a golf ball. The second track has a third contact edge and fourth contact edge configured to simultaneously contact a golf ball. The first track is positioned opposite the second track and is configured to fit a golf ball therebetween. The first track and the second track each have a repeating curvature that produces an undulating path for a golf ball between the first location and the second location.

20 Claims, 10 Drawing Sheets

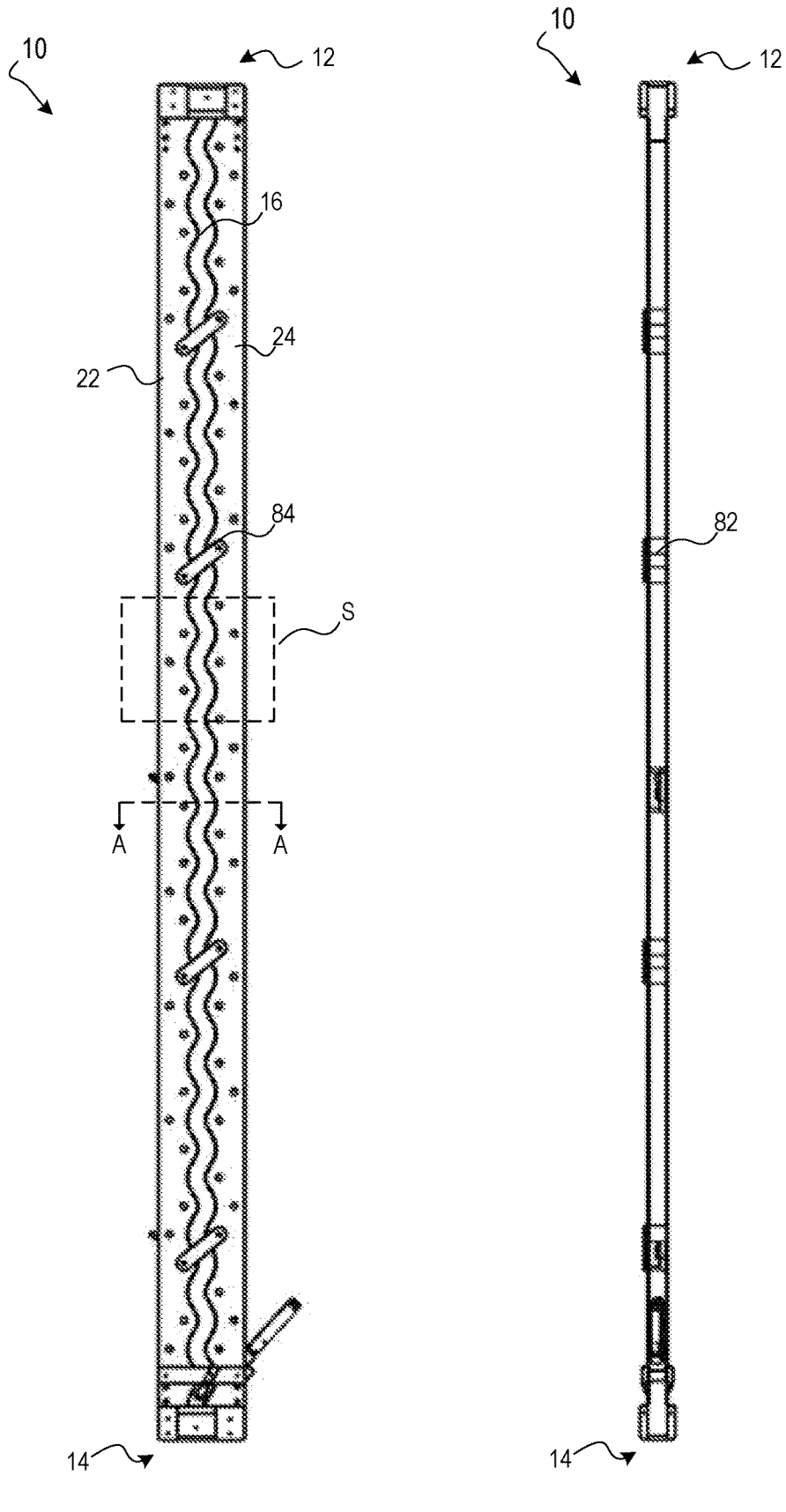
FIG. 1    FIG. 2

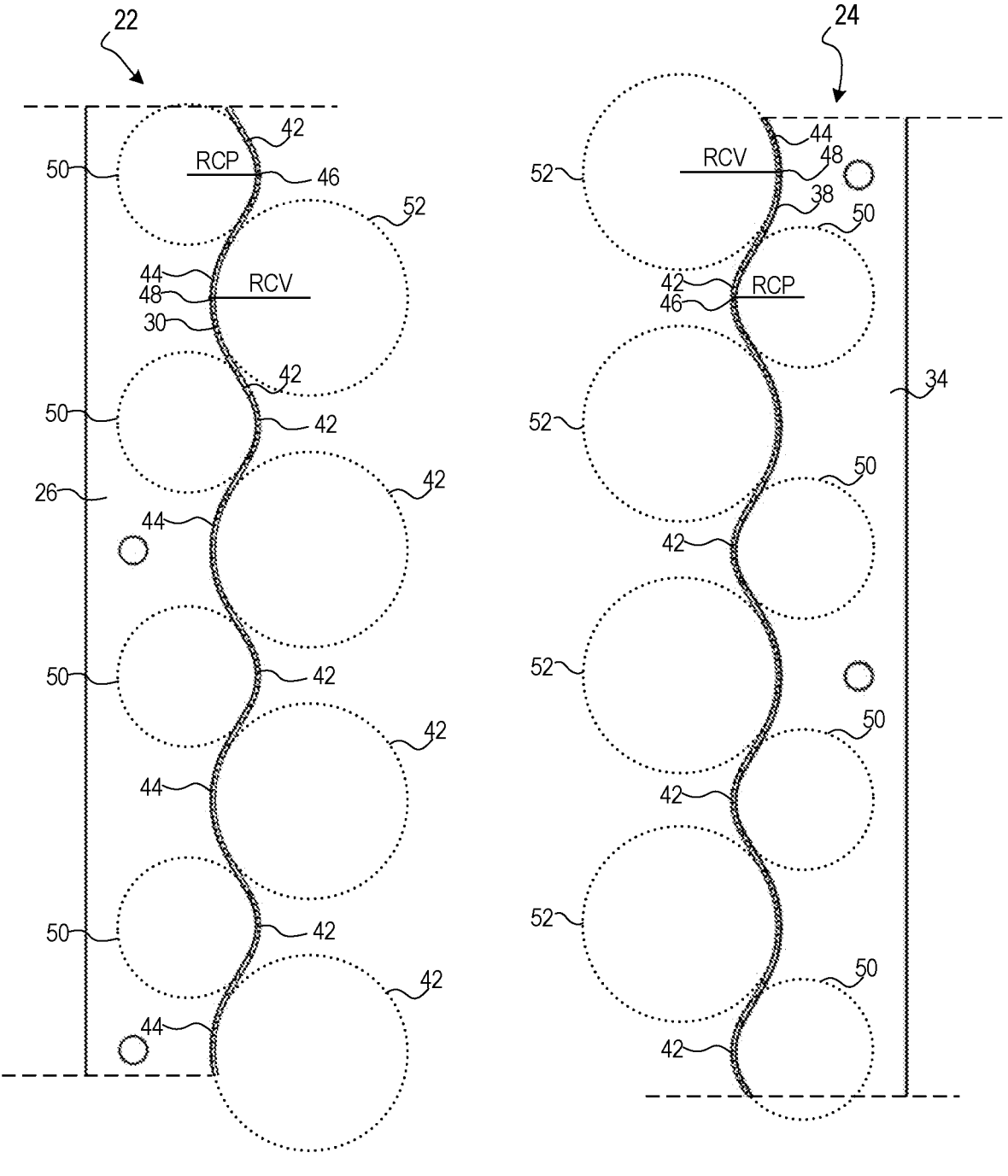
FIG. 6    FIG. 7

1

VERTICAL DELIVERY SYSTEM FOR GOLF BALLS

FIELD OF THE INVENTION

The present disclosure relates generally to a transport system, and, more particularly, to a vertical delivery system for golf balls.

BACKGROUND OF THE INVENTION

Golf ball manufacturing typically includes several steps, such as core molding, cover molding, and finishing. Each of these steps, including several sub-steps, may take place at different stations and locations across manufacturing locations. For example, after cover molding, unfinished golf balls may move to one or more painting stations and one or more printing stations, each of which are likely to be in different locations. Golf balls are often transported between stations in containers, along tracks, and/or manually. In order to optimize manufacturing processes, transport steps should move the golf balls between stations in an orderly fashion while maintaining an identity of the golf ball products (e.g., what type of golf ball is being provided to a station) and preventing damage to the golf balls caused by haphazard or quick movements during transport. Another consideration in product transport includes amount of force and energy to physically move golf balls, which involves cost and resources.

The present disclosure includes a golf ball delivery system that takes these desired characteristics into consideration and provides efficient and controllable delivery of golf balls between two locations, where one location is above the other, in order to utilize gravity as a force to move the golf balls.

SUMMARY OF THE INVENTION

According to some embodiments, a system for transporting a golf ball from a first location to a second location is disclosed. The system includes a first track including a first contact edge and a second contact edge configured to simultaneously contact a golf ball. The system also includes a second track including a third contact edge and fourth contact edge configured to simultaneously contact a golf ball. The first track is positioned opposite the second track and configured to fit a golf ball therebetween. The first track and the second track each include a repeating curvature that produces an undulating path for a golf ball between the first location and the second location.

According to some other embodiments, a system for transporting a golf ball from a first location to a second location is disclosed, wherein the first location is above the second location. The system includes a first track including a first contact edge and a second contact edge configured to simultaneously contact a golf ball. The system also includes a second track including a third contact edge and fourth contact edge configured to simultaneously contact a golf ball. The first track is positioned opposite the second track to define a path configured to fit a golf ball therein. The path includes a repeating curvature. The system also includes a top mount connected to the first track and the second track and including a ball entrance for introducing a golf ball into the path. The system also includes a bottom mount connected to the first track and the second track and including a ball exit for allowing a golf ball to leave the path. The system additionally includes a dispensing system configured to selectively release a golf ball through the ball exit.

According to some other embodiments, a transport track for a golf ball is disclosed. The transport track includes a first track including a first contact edge in a first plane and a second contact edge in a second plane configured to simultaneously contact a golf ball, wherein the first plane is parallel to the second plane. The transport track also includes a second track including a third contact edge in the first plane and a fourth contact edge in the second plane configured to simultaneously contact a golf ball. The first track is positioned opposite the second track to define a path configured to fit a golf ball therein. The first plane is spaced from the second plane by less than 1.68". Also, along the height of the path, the first contact edge remains spaced from the third contact edge and the second contact edge remains spaced from the fourth contact edge by a distance DGap. DGap is less than 1.68".

BRIEF DESCRIPTION OF THE DRAWINGS

The foregoing and other aspects of the present invention are best understood from the following detailed description when read in connection with the accompanying drawings. For the purpose of illustrating the invention, there are shown in the drawings embodiments that are presently preferred, it being understood, however, that the invention is not limited to the specific instrumentalities disclosed. Included in the drawings are the following Figures:

FIG. 1 is a front view of a transport track for a vertical delivery system, consistent with disclosed embodiments;

FIG. 2 is a side view of the transport track of FIG. 1;

FIG. 6 is a side view of a portion of the first track of FIG. 4, consistent with disclosed embodiments;

FIG. 7 is a side view of a portion of the second track of FIG. 5, consistent with disclosed embodiments;

DETAILED DESCRIPTION OF THE INVENTION

Figure 3:
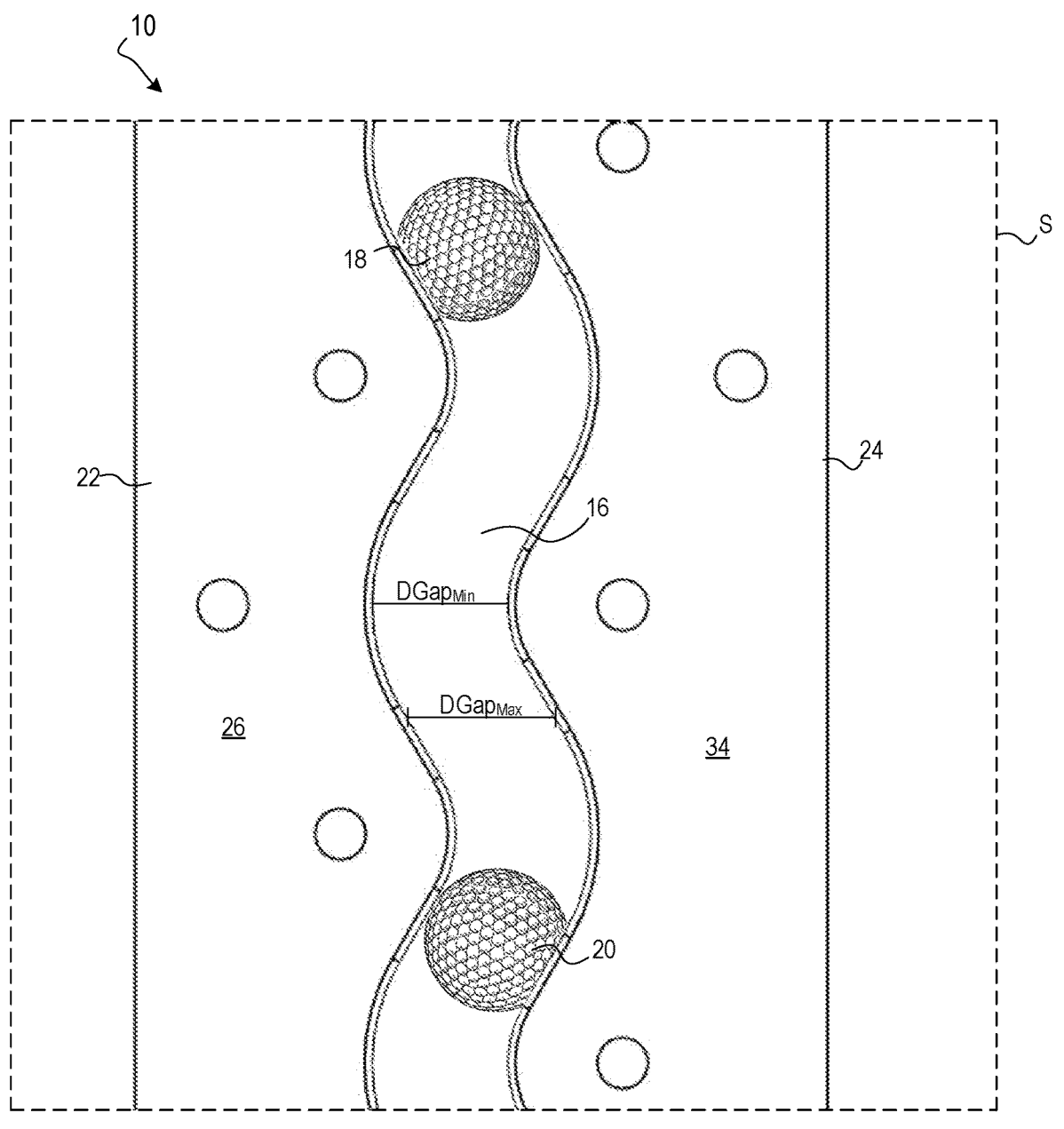
FIG. 3 is a close-up view of a section S of the transport track of FIG. 1.

Disclosed embodiments include systems, devices, and methods for transporting a generally spherical object such as a golf ball or a golf ball subassembly (e.g., a golf ball core, unfinished golf ball, unpainted golf ball, etc.) between locations. In the context of the present disclosure, the term golf ball can be considered to refer to a golf ball, a golf ball subassembly, or other generally spherical object similar to a golf ball. Further, the term location refers to a point or area within physical space or place. Two "locations" may be within the same building or space, separated by any distance. For example, a first location may be near a ceiling area of a space and a second location may be beneath the first location, closer to a floor area.

The disclosed embodiments include a delivery system for transporting golf balls from a first location to a second location, where the first location is above the second location such that the delivery system at least partially relies on the force of gravity to move the golf balls through the delivery system. In an exemplary embodiment, a disclosed delivery system includes a transport track extending from a first location to a second location. The transport track may include an entrance at the first location for receiving a golf ball and an exit for dispensing the golf ball at the second location.

The transport track may include several boundary elements to contain the golf ball and direct the golf ball through a predetermined path from the first location to the second location. For example, the transport track may include a first track on one side that contacts golf balls and an oppositely-disposed second track that also contacts the golf balls in order to limit the horizontal movement of the golf ball and direct the golf ball along the predetermined path. In some embodiments, the transport track includes a plurality of plates that each define a contact edge configured to contact the golf ball. The contact edges collectively guide the golf ball through the predetermined path of the transport track, at least partially using gravity as a force to urge the ball to roll along the contact edges.

FIG. 1 is a front view of a transport track 10 according to an exemplary embodiment. FIG. 2 is a side view of the transport track 10. The transport track 10 is configured to transport a golf ball (and/or a plurality of golf balls in succession) from a first location 12 to a second location 14 along a path 16. In disclosed embodiments, the transport track 10 is oriented such that the first location 12 is above the second location 14. In some embodiments, the transport track 10 is oriented such that the first location 12 is directly above and vertically in line with the second location 14.

According to disclosed embodiments, the path 16 is curvilinear. The curvilinear shape of the path 16 causes a golf ball in the transport track 10 to descend the vertical distance between the first location 12 and the second location 14 slower compared to a straight path enabling the golf ball to accelerate at a greater rate. In the depicted example, the path 16 follows a back-and-forth undulating curvature from the first location 12 to the second location 14.

FIG. 3 is a close-up view of section S shown in FIG. 1. The transport track 10 is configured to receive a plurality of golf balls, such as golf balls 18 and 20. The transport track 10 includes a first track 22 and a second track 24. The path 16 is at least partially defined by the first track 22, the second track 24, and the space therebetween. The first track 22 is positioned opposite the second track 24 and configured to fit a golf ball therebetween. In some aspects, the path 16 is bounded by the first track 22 and second track 24 on opposite sides. As a result, golf balls following the path 16 alternatingly contact and roll along the first and second tracks 22, 24 according to the back-and-forth curvature. The vertical configuration of the transport track 10 allows gravity to move the golf balls 18, 20 through the path 16.

In some embodiments, the curvature of the path 16 urges golf balls contacting one of the tracks 22, 24 toward the other of the tracks 22, 24 until contact is switched and the pattern repeats. For example, the golf ball 18 is in a position where it is primarily in contact with the first track 22 as the path 16 diverts toward the second track 24 and the golf ball 20 is in a position where it is primarily in contact with the second track 24 as the path 16 diverts toward the first track 22. Golf balls, including golf balls 18 and 20, may roll along the first and second tracks 22, 24 to follow the path 16 through the entire transport track 10 to be delivered from the first location 12 to the second location 14.

Figure 4:
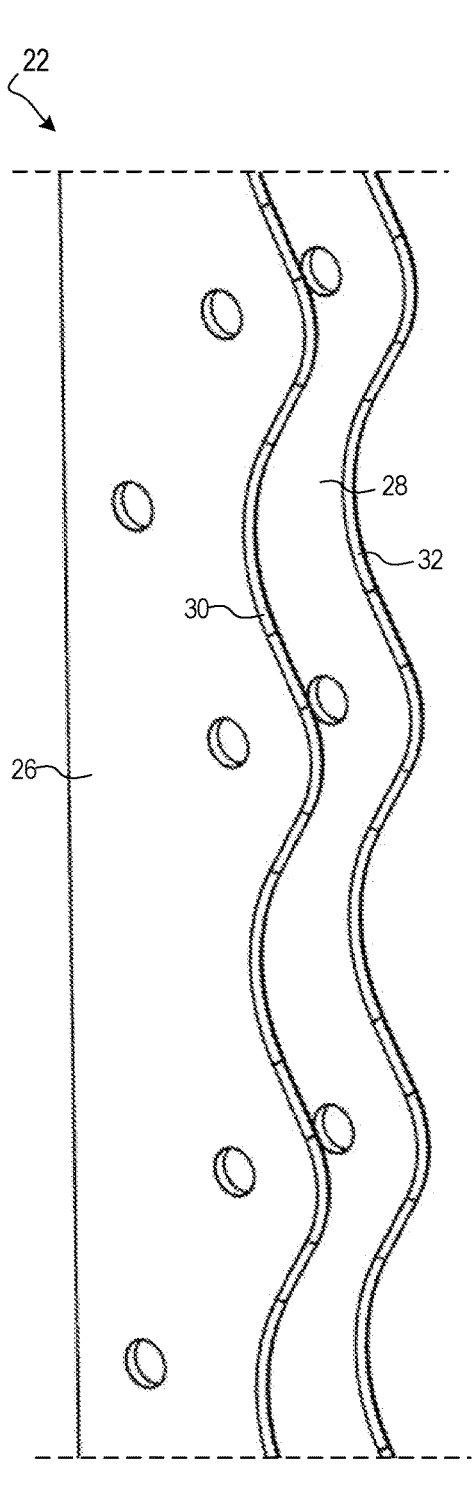
FIG. 4 is a perspective view of a first track of the transport track of FIG. 1.
Figure 5:
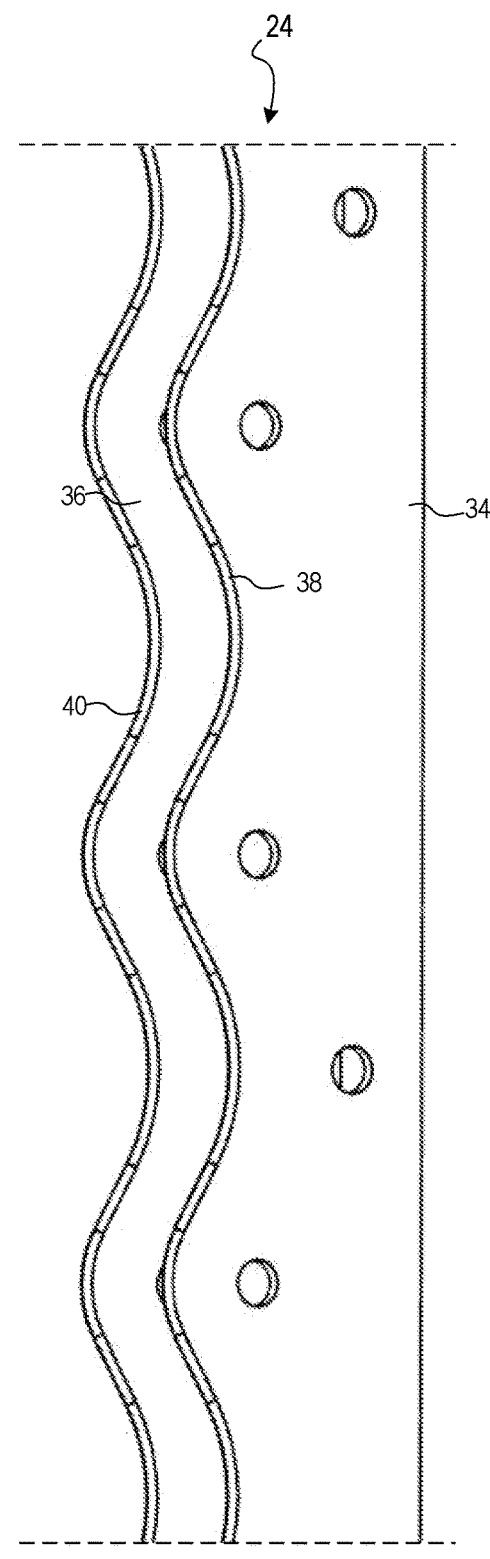
FIG. 5 is a perspective view of a second track of the transport track of FIG. 1.

FIG. 4 is a perspective view of a portion of the first track 22 and FIG. 5 is a perspective view of a portion of the second track 24. In an exemplary embodiment, the first track 22 includes a first plate 26 and a second plate 28. The first plate 26 defines a first contact edge 30. The second plate 28 defines a second contact edge 32. In an exemplary embodiment, the second track 24 includes a third plate 34 and a fourth plate 36. The third plate 34 defines a third contact edge 38. The fourth plate 36 defines a fourth contact edge 40. The contact edges 30, 32, 38, and 40 may exposed boundary edges of the respective one of the plates 26, 28, 34, or 36. In some embodiments, the contact edges 30, 32, 38, and 40 may be rounded edges that gradually transition from a point into a flat portion of the respective one of the plates 26, 28, 34, or 36.

In exemplary embodiments, the first plate 26 and the second plate 28 are configured such that the first contact edge 30 and the second contact edge 32 simultaneously contact a golf ball within the path 16 as the golf ball is directed by (i.e., rolls along) the first track 22. Further, the third plate 34 and the fourth plate 36 are configured such that the third contact edge 38 and the fourth contact edge 40 simultaneously contact a golf ball within the path 16 as the golf ball is directed by (i.e., rolls along) the second track 24.

According to disclosed embodiments, the positioning of the contact edges 30, 32, 38, and 40 define the path 16 for golf balls in the transport track 10. The contact edges 30, 32 of the first track 22 include a repeating curvature of alternating peaks and valleys. The contact edges 30 and 32 are positioned parallel to each other in different planes spaced by a distance between the plates 26, 28. The contact edges 38, 40 of the second track 24 also include a repeating curvature of alternating peaks and valleys and are also positioned parallel to each other in different planes spaced by a distance between the plates 34, 36.

FIG. 6 is a side view of the first track 22, depicting the first plate 26 and the first contact edge 30. It can be assumed that the second plate 28 and second contact edge 32 have the same side appearance just behind the first plate 26. FIG. 7 is a side view of the second track 24, depicting the third plate 34 and the third contact edge 38. It can be assumed that the fourth plate 36 and the fourth contact edge 40 have the same side appearance just behind the third plate 34. In an exemplary embodiment, each contact edge 30, 32, 38, 40 includes a repeating curvature defined by a repeating pattern of peaks 42 and valleys 44. Each peak 42 includes an apex point 46 and each valley 44 includes a base point 48.

Further, in an exemplary embodiment, the curvature of the first track 22 is the same as but vertically offset relative to the curvature of the second track 24. The repeating curvature of the first contact edge 30 and the second contact edge 32 is vertically offset from the repeating curvature of the third contact edge 38 and the fourth contact edge 40. For example, the peaks 42 of the repeating curvature of the first track 22 may be positioned horizontally opposite from the valleys 44 of the repeating curvature of the second track 24, and vice versa. More particularly, the peaks 42 of the curvature of the first contact edge 30 are opposite from the valleys 44 of the curvature of the third contact edge 38, the valleys 44 of the curvature of the first contact edge 30 are opposite from the peaks 42 of the curvature of the third contact edge 38, the peaks 42 of the curvature of the second contact edge 32 are opposite from the valleys 44 of the curvature of the fourth contact edge 40, and the valleys 44 of the curvature of the second contact edge 32 are opposite from the peaks 42 of the fourth contact edge 40. For example, each apex point 46 of the first contact edge 30 is horizontally aligned with each base point 48 of the third contact edge 38, and vice versa, and each apex point 46 of the second contact edge 32 is horizontally aligned with each base point 48 of the fourth contact edge 40, and vice versa. The resulting configuration produces the undulating, back-and-forth curvature of the path 16 of the transport track 10.

The radius of curvature RCP of each peak 42 at each apex point 46 is shown by dotted circles 50. The radius of curvature RCV of each valley 44 at each base point 48 is shown by dotted circles 52. In an exemplary embodiment, the peaks 42 include a smaller radius of curvature than the valleys 44 of each contact edge 30, 32, 38, 40. In other words, the dotted circles 50 corresponding to the curvature of the peaks 42 may be smaller than the dotted circles 52 corresponding to the curvature of the valleys 44. In an exemplary aspect, the difference in radius of curvature helps each golf ball to roll smoothly through the valleys 44 without contacting the contact edges of the opposite track and becoming stuck within the transport track 10. For example, the radius of curvature of the valleys 44 may be 1.5-2.0 times greater than the radius of curvature of the peaks 42. In one embodiment, the ratio of the radius of curvature of the valleys 44 to the radius of curvature of the peaks 42 is approximately 1.75/1.

Figure 8:
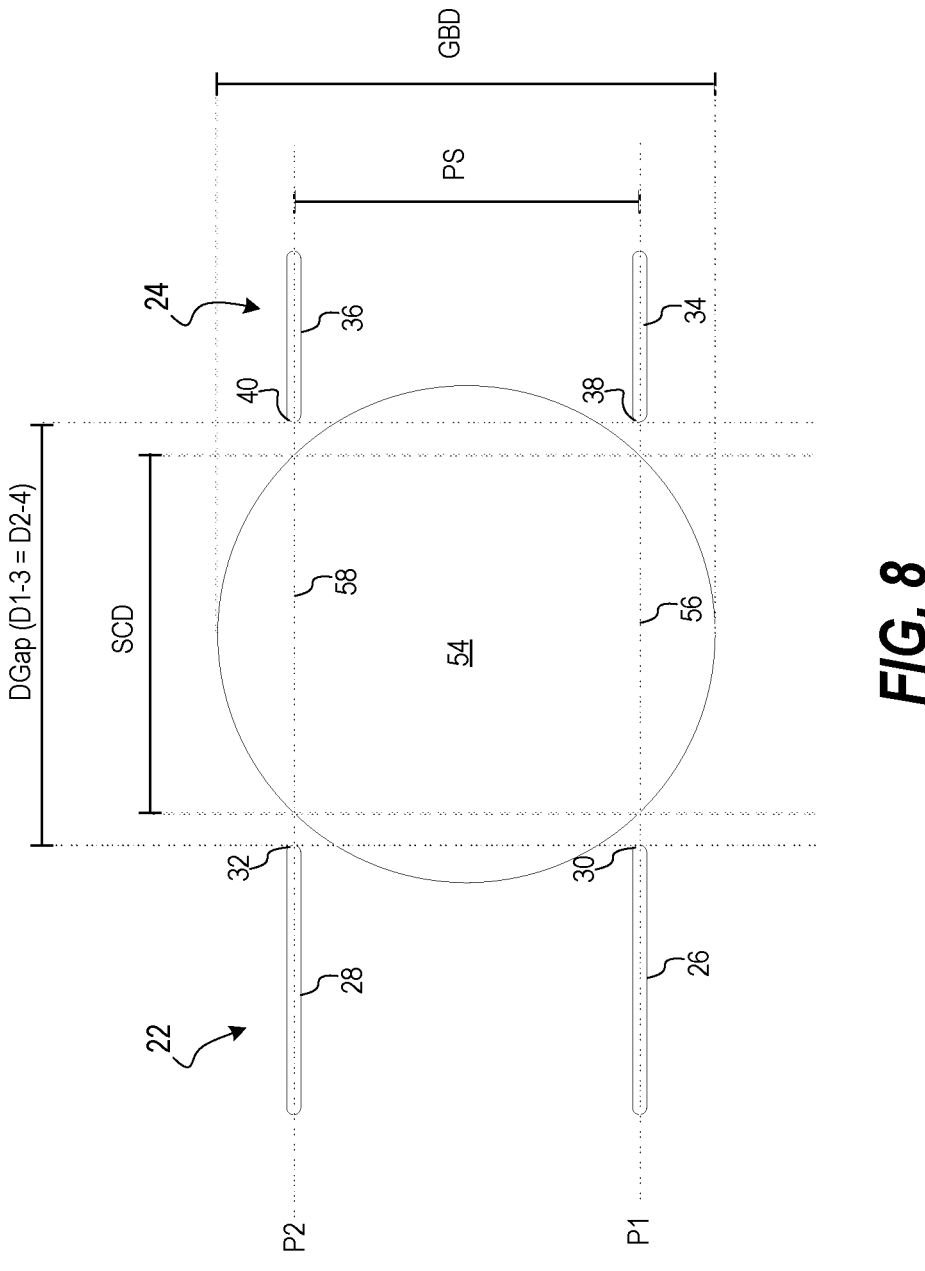
FIG. 8 is a cross-sectional view of the transport track of FIG. 1, taken through line A-A and further including a golf ball positioned in the transport track and the cross-section.

FIG. 8 is an approximate cross-sectional view of the transport track 10 through line A-A of FIG. 1, including a golf ball 54 positioned between the portion of the first track 22 and second track 24 shown. The golf ball 54 includes a diameter GBD. In an exemplary embodiment, the GBD is approximately 1.65-1.70", for example 1.68". FIG. 8 further depicts the relative positioning of the first track 22 and second track 24 relative to two planes P1 and P2. Each plane P1 and P2 may be visualized as a vertical plane parallel to the extent of the vertical transport track 10 shown in FIG. 1. The plane P1 is parallel to the plane P2.

In an exemplary embodiment, the first plate 26 and the third plate 34 are generally aligned with each other in the plane P1 and the second plate 28 and fourth plate 36 are generally aligned with each other in the plane P2. In another aspect of the exemplary embodiment, the first contact edge 30 is aligned with the third contact edge 38 in the plane P1 and the second contact edge 32 is aligned with the fourth contact edge 40 in the plane P2. The plane P1 is spaced from the plane P2 by a distance PS. In exemplary embodiments, PS is less than the diameter of a golf ball GBD (e.g., less than 1.68") such that a golf ball cannot fall between the pairs of contact edges. For example, the distance between the planes PS is approximately 1.2-1.4", for example 1.28". In other words, the distance between the first contact edge 30 and the second contact edge 32 is approximately 1.28" and the distance between the third contact edge 38 and the fourth contact edge is also approximately 1.28".

While FIG. 8 is not drawn to scale, it can still be seen that the distance between the contact edges of each respective track 22, 24 (i.e., the distance between the planes PS), is less than the diameter GBD of the golf ball 54. As a result, in addition to containing the golf ball 54 without escaping between the contact edges, the golf ball 54 simultaneously contacts the first contact edge 30 and the second contact edge 32 to roll along the first track 22 and/or separately simultaneously contacts the third contact edge 38 and the fourth contact edge 40 to roll along the second track 24.

Within the plane P1, the first contact edge 30 is spaced from the third contact edge 38 by a distance D1-3, and within the plane P2, the second contact edge 32 is spaced from the fourth contact edge 40 by a distance D2-4. In an exemplary embodiment D1-3 is equal to D2-4 (also referred to herein as distance DGap) such that a width of the path 16 is equal between both sets of contact edges. The distance DGap is preferably less than the diameter GBD of the golf ball 54 (e.g., less than 1.68") such that the golf ball 54 cannot escape between the gaps between the first and third contact edges and second and fourth contact edges. In an exemplary embodiment, the distance DGap remains within a desired spacing range throughout a vertical length of the path 16, with some variation due to the varying radii of curvature shown in FIGS. 6 and 7. For example, as shown in FIG. 3, the distance DGap may be at a minimum ($DGap_{Min}$) at heights between apex points 46 and base points 48 and at a maximum ($DGap_{Max}$) at heights between opposing inflection points between the peaks 42 and valleys 44. Other embodiments may include different radii of curvature that produce different DGap spacings.

As described herein, the distance between the planes PS is less than the golf ball diameter GBD. As a result, the planes P1 and P2 cut through the golf ball 54 at spherical circles 56, 58, each having a diameter SCD. The spherical circle 56 generally defines the points around the golf ball 54 that may be contacted by the first contact edge 30 and third contact edge 38 and the spherical circle 58 generally defines the points around the golf ball 54 that may be contacted by the second contact edge 32 and the fourth contact edge 40. In order to enable the golf ball 54 to freely move and roll within the path 16 by alternatingly contacting the first track 22 and second track 24, the distance DGap is greater than the diameter SCD of the spherical circles 56, 58. For example, the diameter SCD may be approximately 1.1"-1.4", for example approximately 1.1", while the distance DGap may be approximately 1.0"-1.5", depending on the vertical location along the transport track 10. For example the distance DGap may have a minimum of approximately 1.17" and a maximum of approximately 1.29".

The disclosed exemplary transport track 10 includes the described configuration of the first track 22 and second track 24 to produce the path 16 for a plurality of golf balls. The transport track 10 is an example of a relatively long device for transporting the plurality of golf balls from a first location 12 to a second location 14 that may be much higher than the first location 12. For instance, the transport track 10 may be approximately 15-20' in height to enable a golf ball to be delivered from an upper floor of a building to a lower floor beneath. Other embodiments may cover shorter or longer distances to transport golf balls between locations of varying distances. For example, another embodiment of a transport track may be 1-5' in height to deliver golf balls from one manufacturing station to a nearby adjacent station.

The disclosed transport track 10 may include additional features for enabling golf balls to enter and exit the path 16 to be delivered from the first location 12 to the second location 14. Other transport rack embodiments may include the same or similar features for controlling the entrance and exit of golf balls into the transport track. Further, disclosed transport tracks may have elements to monitor golf balls within the paths, such as sensors to detect a position of golf balls within the path.

Figure 9:
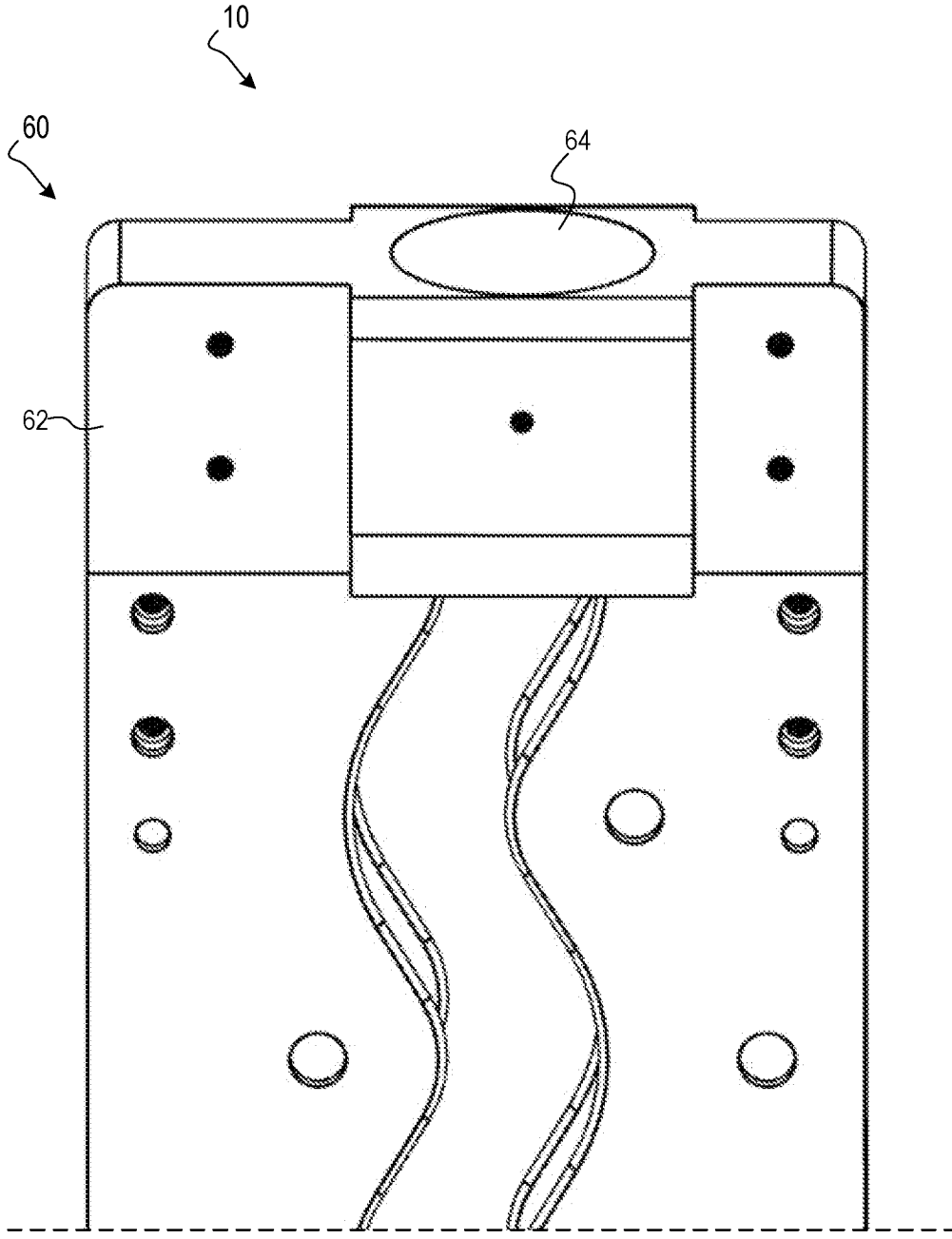
FIG. 9 is perspective view of a top portion of the transport track of FIG. 1, including a ball entrance consistent with disclosed embodiments.

FIG. 9 depicts a top portion 60 of the transport track 10, according to an exemplary embodiment. The top portion 60 includes a top mount 62. The top mount 62 is a ball entrance for enabling golf balls to enter the transport track 10 at the first location 12. For example, the top mount 62 includes an entrance hole 64 adjacent to first and second tracks 22, 24 for introducing golf balls into the path 16. The entrance hole 64 may include a circular opening larger than the size of a golf ball. The top mount 62 may be a rigid component formed from metal or plastic, for example. The top mount 62 may be rigidly attached to the plates 26, 28, 34, 36 (e.g., by screws, bolts rivets, etc.).

Figure 10:
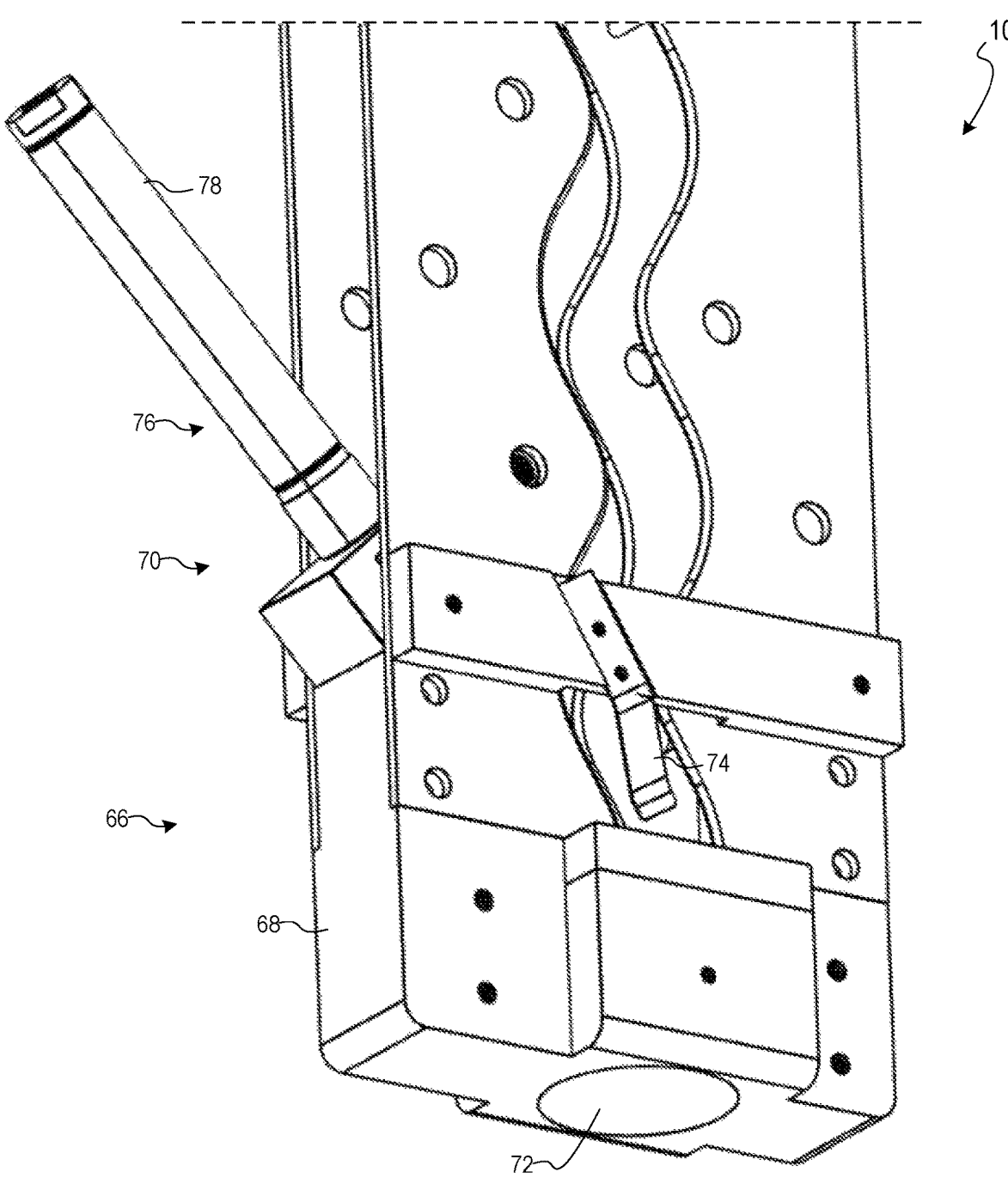
FIG. 10 is a perspective view of a bottom portion of the transport track of FIG. 1, including a ball exit and dispenser consistent with disclosed embodiments.
Figure 11:
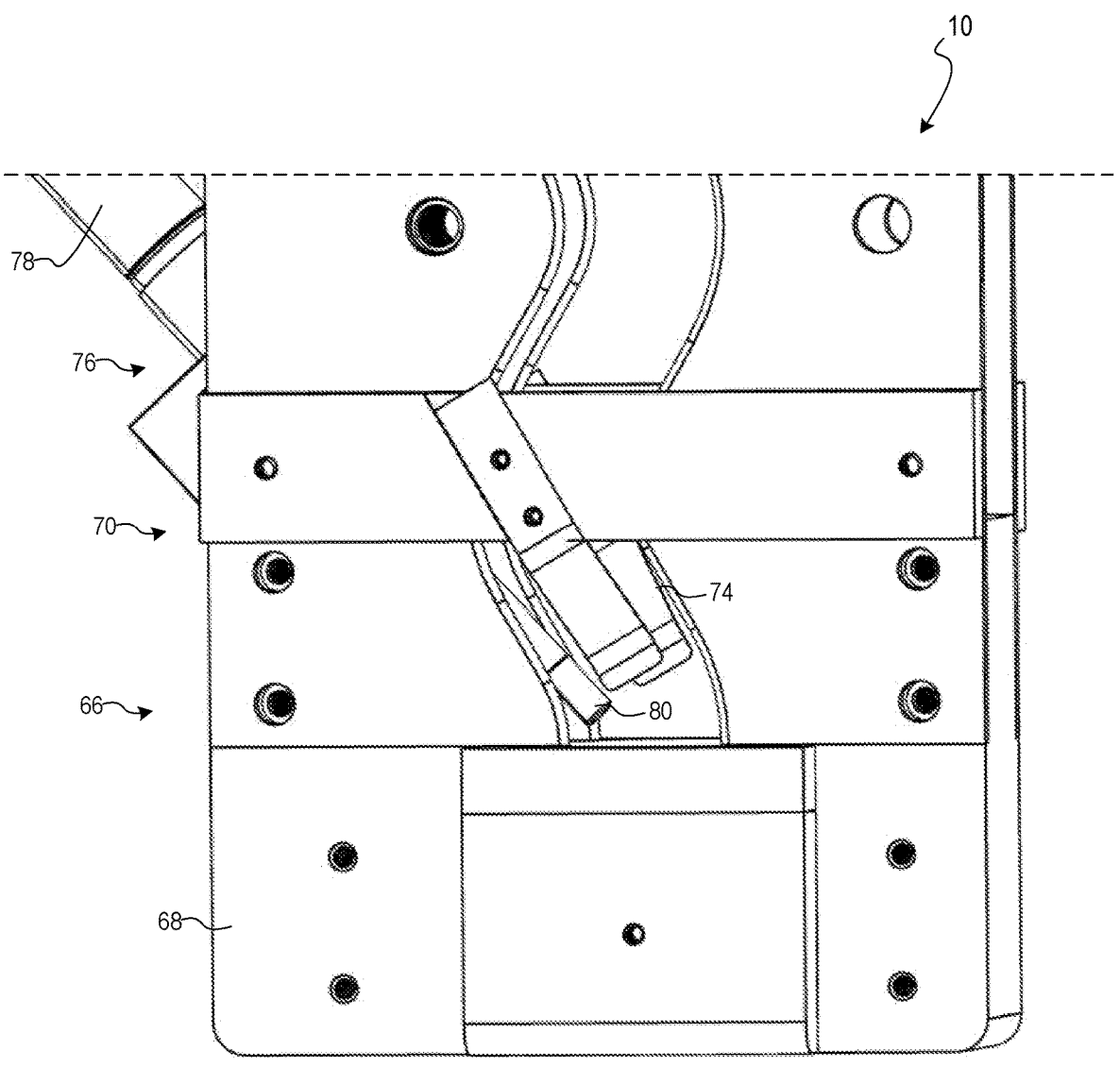
FIG. 11 is another perspective view of the bottom portion of the transport track of FIG. 10.
Figure 12:
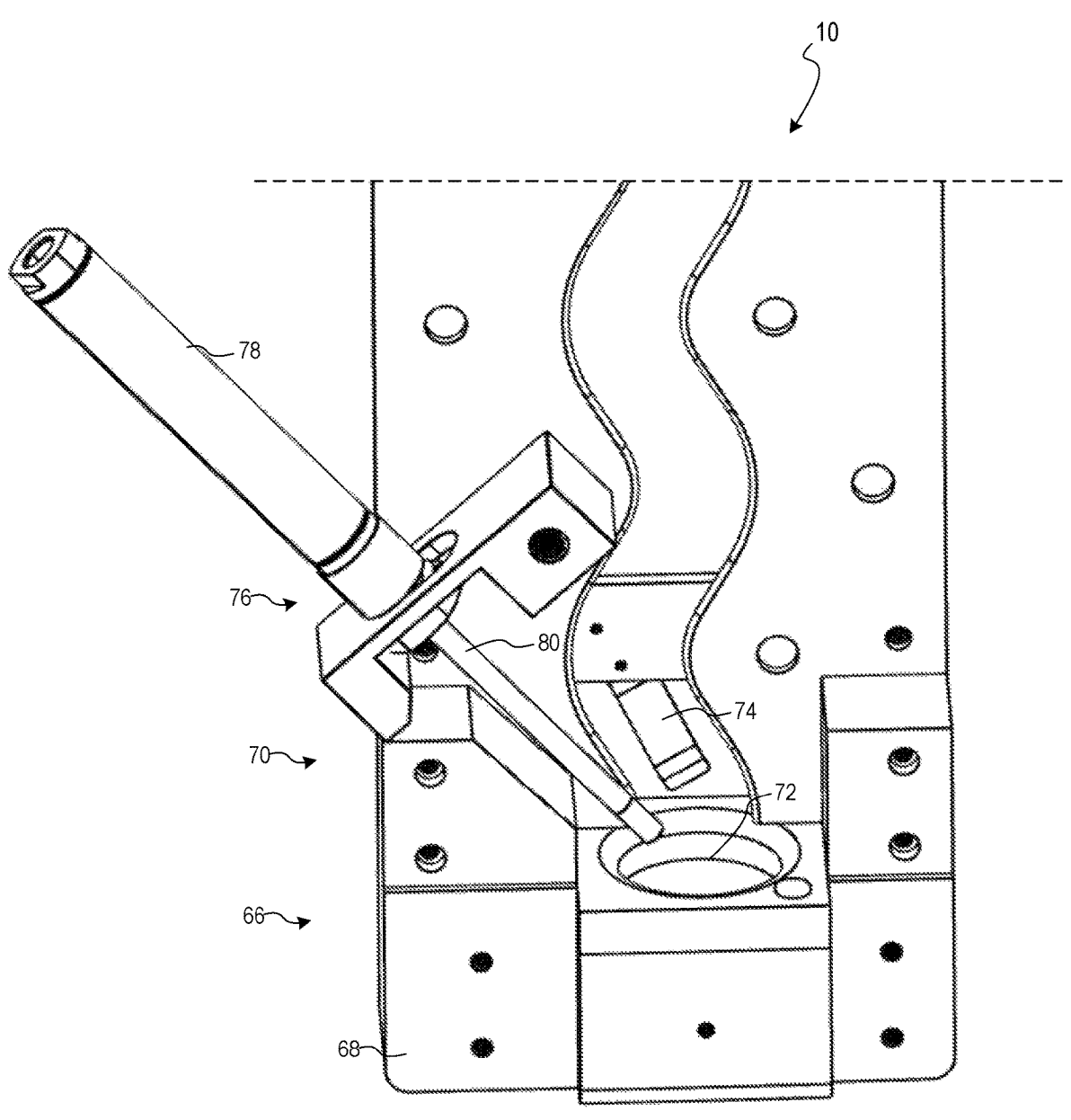
FIG. 12 further depicts details of the ball exit and dispenser of FIGS. 10 and 11.

FIGS. 10-12 depict a bottom portion 66 of the transport track 10, according to an exemplary embodiment. FIG. 12 is a view of the bottom portion 66 with the first plate 26 and third plate 34 removed to more clearly depict additional features at the bottom portion 66. In an exemplar embodiment, the bottom portion 66 includes a bottom mount 68 and a dispensing system 70. The bottom mount 68 is a ball exit for enabling golf balls to exit the transport track 10 at the second location 14. For example, the bottom mount 68 includes an exit hole 72 adjacent to the first and second tracks 22, 24 for allowing golf balls to leave the path 16 and separate from the transport track 10. Golf balls may fallから the bottom of the path 16 into a chamfered opening of the exit hole 72 and thereby exit the transport track 10. The bottom mount 68 may be a rigid component formed from metal or plastic, for example. The bottom mount 68 may be rigidly attached to the plates 26, 28, 34, 36 (e.g., by screws, bolts rivets, etc.).

In some embodiments, the dispensing system 70 is configured to selectively control the exit of golf balls from the transport track 10. For example, the dispensing system 70 may include a ball stop 74 configured to prevent a golf ball from exiting the transport track 10 at the bottom portion 66. In an exemplary embodiment, the ball stop 74 includes a pair of flexible fingers configured to hold a golf ball in place. For example, the flexible fingers may be present in the path 16 and spaced from each other a distance less than the diameter of the golf ball GBD such that a golf ball becomes trapped between the flexible fingers. A golf ball may thereby be held in place at the bottom mount 68 without falling through the exit hole 72. The ball stop 74 may be configured to produce enough force to enable subsequent golf balls moving through the path 16 to stack on top of the golf ball held by the ball stop 74. As a result, a line/queue of golf balls may stack up within the path 16, prior to exiting through the bottom mount 68.

The dispensing system 70 further includes a release mechanism 76 configured to cause a golf ball to bypass the ball stop 74 and exit the transport track 10 through the exit hole 72. For example, the release mechanism 76 may include an actuating cylinder 78 and a rod 80 configured to be selectively extended and/or retracted by the actuating cylinder 78. The actuating cylinder 78 and rod 80 may be arranged such that extension of the rod 80 forces a golf ball to pass the ball stop 74. For example, the rod 80 may apply a force to the golf ball held by the ball stop 74 to overcome the force of the flexible fingers and allow the golf ball to exit through the exit hole 72. In one embodiment, the actuating cylinder 78 and rod 80 are mounted between the first plate 26 and the second plate 28. After the rod 80 is extended and a golf ball exits the transport track 10, the rod 80 may be retracted to enable a next golf ball to become held by the ball stop 74.

In some embodiments, the release mechanism 76 may be electronically controlled to cause the release of a golf ball from the transport track 10. For example, a manufacturing station at the second location 14 may include a computing component configured to provide instructions to the actuating cylinder 78 to move the rod 80 and release a golf ball into a receiving area of the manufacturing station at the second location 14.

Disclosed transport tracks may be a component of a vertical delivery system to transport golf balls from a first location to a second location that is below the first location. Golf balls may roll alternatingly (or, in other embodiments, simultaneously) along first and second tracks at least partially due to gravity to deliver each golf ball to a ball exit. The curvature of the tracks helps to control the descent of the golf balls in the path and thereby inhibit the golf balls from becoming damaged due to excess speed and collisions with other golf balls or components.

In some embodiments, a dispensing system enables selective control of the golf balls within the transport track, allowing a system or user to select a timing for a golf ball to be released from the transport track. Further the dispensing system allows golf balls to build up in a line/queue within the path such that a selected group of golf balls can be positioned and ready to be released from the transport track at the second location. In some embodiments, a delivery system may include one or more sensors positioned along a height of the transport track to detect the presence of golf balls at different height positions, such as to determine how many golf balls are present in the transport track and prevent overflow.

The disclosed transport tracks may be particularly suitable for delivering golf balls vertically and thereby may only take up a small top-view footprint within a manufacturing area. The size of the components (e.g., plates) that make up the first and second tracks may determine the width of the overall transport track and can made relatively small relative to their height. The physical structures that make up the transport tracks may be separate components attached to each other or integrally formed components. For example, referring back to FIGS. 1 and 2, the first plate 26 may be rigidly attached to the second plate 28 and the third plate 34 may be rigidly attached to the fourth plate 36 by a plurality of attachment mounts 82 positioned between the sets of plates. In other embodiments, the first plate 26 and second plate 28 may be integrally formed as one piece and/or the third plate 34 and the fourth plate 36 may also be integrally formed as one piece. In some embodiments, the first plate 26 may be rigidly attached to the third plate 34 and the second plate 28 may be rigidly attached to the fourth plate 36 by a plurality of attachment brackets 84 (FIG. 2). Other transport track embodiments may use other components other than plates, such as bars or cylinders to arrange the contact edges.

Figure 13:
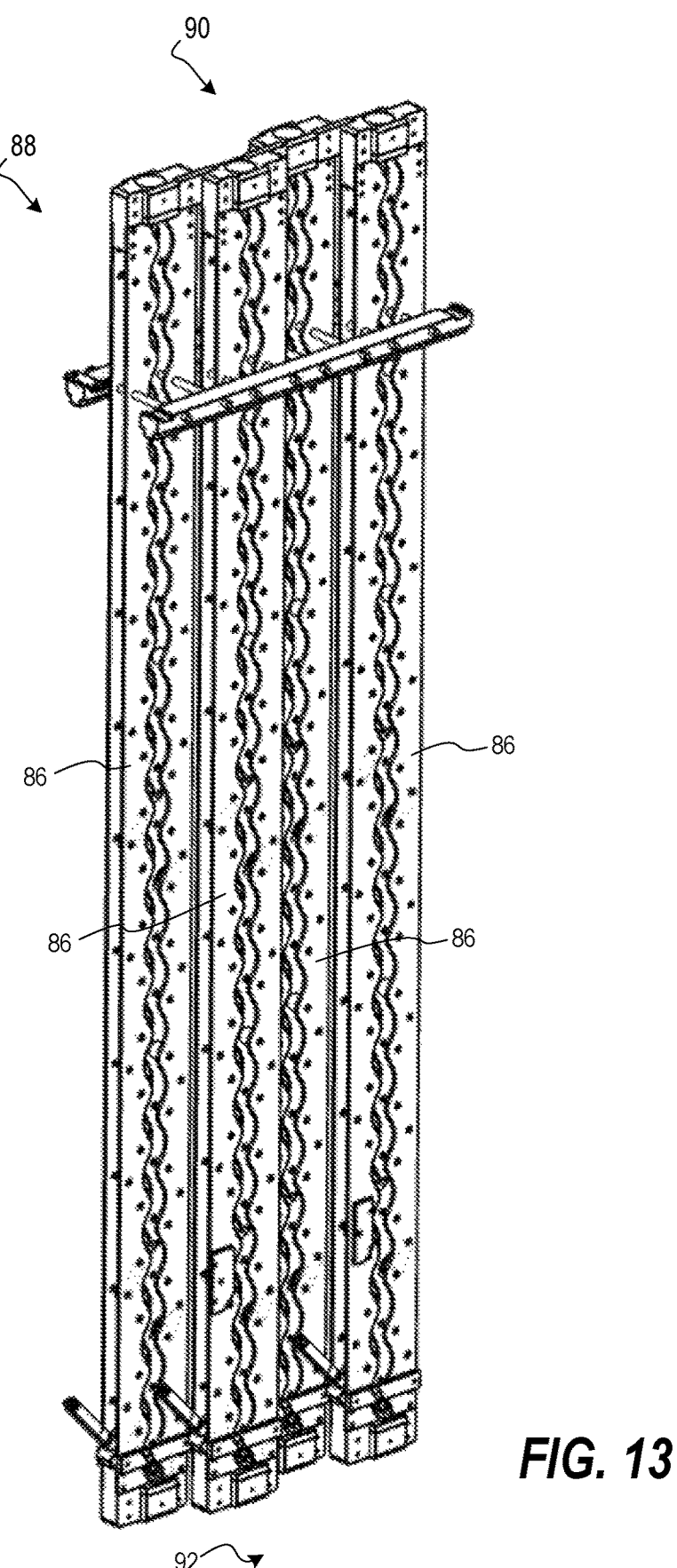
FIG. 13 is an embodiment of a vertical delivery system having multiple transport tracks attached in a set.

Further, disclosed transport tracks may be suitable for interconnections to increase volume and introduce additional paths for delivering golf balls. For example, as shown in an exemplary embodiment in FIG. 13, a plurality of transport tracks 86 may be attached to each other in a set 88 to provide multiple parallel paths from a first location 90 to a second location 92. For example, four transport tracks 86 may be connected to each other or otherwise positioned adjacent to each other to allow multiple golf balls to be simultaneously delivered to the second location 92 in parallel. Each transport track 86 may be the same or similar to the transport track 10 disclosed herein, including the associated features. The set 88 enables a delivery system to transport more golf balls simultaneously while maintaining a small top-view footprint that does not take up a large amount of floor space within a manufacturing area.

Unless otherwise defined, all terms (including technical and scientific terms) used herein have the same meaning as commonly understood by one of ordinary skill in the art of this disclosure. It will be further understood that terms, such as those defined in commonly used dictionaries, should be interpreted as having a meaning that is consistent with their meaning in the context of the specification and should not be interpreted in an idealized or overly formal sense unless expressly so defined herein. Well known functions or constructions may not be described in detail for brevity or clarity.

The terms "about" and "approximately" shall generally mean an acceptable degree of error or variation for the quantity measured given the nature or precision of the measurements. Numerical quantities given in this description are approximate unless stated otherwise, meaning that the term "about" or "approximately" can be inferred when not expressly stated.

The terminology used herein is for the purpose of describing particular embodiments only and is not intended to be limiting. As used herein, the singular forms "a", "an" and "the" are intended to include the plural forms as well (i.e., at least one of whatever the article modifies), unless the context clearly indicates otherwise.

The terms "first," "second," and the like are used to describe various features or elements, but these features or elements should not be limited by these terms. These terms are only used to distinguish one feature or element from another feature or element. Thus, a first feature or element discussed below could be termed a second feature or element, and similarly, a second feature or element discussed below could be termed a first feature or element without departing from the teachings of the disclosure. Likewise, terms like "top" and "bottom"; "front" and "back"; and "left" and "right" are used to distinguish certain features or elements from each other, but it is expressly contemplated that a top could be a bottom, and vice versa.

The golf balls described and claimed herein are not to be limited in scope by the specific embodiments herein disclosed, since these embodiments are intended as illustrations of several aspects of the disclosure. Any equivalent embodiments are intended to be within the scope of this disclosure. Indeed, various modifications of the device in addition to those shown and described herein will become apparent to those skilled in the art from the foregoing description. Such modifications are also intended to fall within the scope of the appended claims. All patents and patent applications cited in the foregoing text are expressly incorporated herein by reference in their entirety. Any section headings herein are provided only for consistency with the suggestions of 37 C.F.R. § 1.77 or otherwise to provide organizational queues. These headings shall not limit or characterize the invention(s) set forth herein.

What is claimed is:

1. A system for transporting a golf ball from a first location to a second location, the system comprising:
   a first track comprising a first contact edge and a second contact edge configured to simultaneously contact a golf ball; and
   a second track comprising a third contact edge and fourth contact edge configured to simultaneously contact a golf ball,
   wherein the first track is positioned opposite the second track and configured to fit a golf ball therebetween, wherein the first track and the second track each comprise a repeating curvature that produces an undulating path for a golf ball between the first location and the second location,
   wherein the first contact edge follows the repeating curvature in a first plane and the second contact edge follows the repeating curvature in a second plane that is spaced from and parallel to the first plane, and
   wherein an inflection point of the repeating curvature of the first track is horizontally spaced from an inflection point of the repeating curvature of the second track.

2. The system of claim 1, wherein the first location is above the second location.

3. The system of claim 2, wherein the first location is directly above the second location.

4. The system of claim 1, wherein the third contact edge follows the repeating curvature in the first plane and the fourth contact edge follows the repeating curvature in the second plane.

5. The system of claim 4, wherein the repeating curvature of the first contact edge and the second contact edge is vertically offset from the repeating curvature of the third contact edge and the fourth contact edge.

6. The system of claim 4, wherein the first track comprises:
   a first plate comprising the first contact edge; and
   a second plate comprising the second contact edge.

7. The system of claim 6, wherein the second track comprises:
   a third plate comprising the third contact edge; and
   a fourth plate comprising the fourth contact edge.

8. The system of claim 1, wherein the repeating curvature of the first track and the second track comprises a repeating pattern of peaks and valleys.

9. The system of claim 8, wherein the peaks of the repeating curvature of the first track are positioned horizontally opposite from the valleys of the repeating curvature of the second track, and vice versa.

10. The system of claim 9, wherein the radius of curvature of the peaks is smaller than the radius of curvature of the valleys.

11. A system for transporting a golf ball from a first location to a second location, wherein the first location is above the second location, the system comprising:
   a first track comprising:
      a first plate comprising a first contact edge; and
      a second plate comprising a second contact edge, the first contact edge and the second contact edge configured to simultaneously contact a golf ball;
   a second track comprising:
      a third plate comprising a third contact edge; and
      a fourth plate comprising a fourth contact edge, the third contact edge and the fourth contact edge configured to simultaneously contact a golf ball,
   wherein the first track is positioned opposite the second track to define a path configured to fit a golf ball therein, wherein the path comprises a repeating curvature, and wherein the first plate, the second plate, the third plate, and the fourth plate each comprise a plurality of repeating peaks and valleys that define the repeating curvature;
   a top mount connected to the first track and the second track and comprising a ball entrance for introducing a golf ball into the path;
   a bottom mount connected to the first track and the second track and comprising a ball exit for allowing a golf ball to leave the path; and a dispensing system configured to selectively release a golf ball through the ball exit.

12. The system of claim 11, wherein the dispensing system comprises a ball stop configured to prevent a golf ball from exiting the path.

13. The system of claim 12, wherein the ball stop comprises a pair of flexible fingers configured to hold a golf ball in place.

14. The system of claim 12, wherein the ball stop is configured to hold a golf ball in place such that a plurality of subsequent golf balls moving through the path stack on top of the golf ball held by the ball stop.

15. The system of claim 12, wherein the dispensing system further comprises a release mechanism configured to cause a golf ball to bypass the ball stop and exit the path through the ball exit.

16. The system of claim 15, wherein the release mechanism comprises an actuating cylinder and a rod configured to be selectively extended and retracted by the actuating cylinder to force a golf ball to pass the ball stop.

17. A transport track for a golf ball, comprising:

a first track comprising a first contact edge in a first plane and a second contact edge in a second plane configured to simultaneously contact a golf ball, wherein the first plane is parallel to the second plane;

a second track comprising a third contact edge in the first plane and a fourth contact edge in the second plane configured to simultaneously contact a golf ball, wherein the first track is positioned opposite the second track to define a path configured to fit a golf ball therein;

wherein the first plane is spaced from the second plane by less than 1.68" and wherein, along the height of the path, the first contact edge remains spaced from the third contact edge and the second contact edge remains spaced from the fourth contact edge by a distance DGap, and wherein DGap is less than 1.68".

18. The transport track of claim 17, wherein the first plane is spaced from the second plane by 1.2-1.4".

19. The transport track of claim 17, wherein DGap varies between a minimum and a maximum along the height of the path.

20. The system of claim 1, wherein the first plane is spaced from the second plane by less that 1.68".

* * * * *